United States Patent
Borrego Lebrato et al.

(10) Patent No.: US 10,440,195 B2
(45) Date of Patent: Oct. 8, 2019

(54) CALIBRATING A MEDIA ADVANCE SYSTEM OF A PAGE WIDE ARRAY PRINTING DEVICE

(71) Applicant: Hewlett-Packard Development Company, L.P., Houston, TX (US)

(72) Inventors: Alberto Borrego Lebrato, Sant Cugat del Valles (ES); Francisco Javier Roses Conesa, Sant Cugat del Valles (ES); Tanausu Ramirez, Sant Cugat del Valles (ES); Isidoro Maya, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/748,562

(22) PCT Filed: Oct. 30, 2015

(86) PCT No.: PCT/EP2015/002174
§ 371 (c)(1),
(2) Date: Jan. 29, 2018

(87) PCT Pub. No.: WO2017/071724
PCT Pub. Date: May 4, 2017

(65) Prior Publication Data
US 2018/0220013 A1   Aug. 2, 2018

(51) Int. Cl.
*H04N 1/00* (2006.01)
*B41J 11/42* (2006.01)
(Continued)

(52) U.S. Cl.
CPC ...... *H04N 1/00087* (2013.01); *B41J 2/04558* (2013.01); *B41J 2/04585* (2013.01);
(Continued)

(58) Field of Classification Search
CPC .................. B41J 11/42; B41J 2/04558; B41J 2029/3935; B41J 29/393; B41J 2/155;
(Continued)

(56) References Cited

U.S. PATENT DOCUMENTS

| | | | |
|---|---|---|---|
| 6,076,915 A | 6/2000 | Gast et al. | |
| 6,454,474 B1 | 9/2002 | Lesniak et al. | |
| 6,494,558 B1 | 12/2002 | Doval et al. | |
| 7,216,952 B2 | 5/2007 | Claramunt et al. | |

(Continued)

FOREIGN PATENT DOCUMENTS

| | | |
|---|---|---|
| CN | 101267948 | 9/2008 |
| CN | 101268681 | 9/2008 |

(Continued)

OTHER PUBLICATIONS

Bukkems, Björn et al. "A piecewise linear approach towards sheet control in a printer paper path." In American Control Conference, Jun. 14-16. 2006, pp. 6-pp.

*Primary Examiner* — Saeid Ebrahimi Dehkordy
(74) *Attorney, Agent, or Firm* — HP Inc. Patent Department (57) ABSTRACT

A method of determining calibration values for a media advance system of a page wide array printing device is described. A test pattern is printed on a calibration medium which advances along a media axis through the printing device. The test pattern comprises a plurality of test marks. The test pattern is scanned along a scan axis using a sensor and the calibration medium is advanced along the media axis through the printing device. The dimensions of the scanned test marks are analyzed, and calibration values are determined from the analyzed dimensions of the test marks. The scan axis is orthogonal to the media axis.

15 Claims, 8 Drawing Sheets

(51) Int. Cl.
　　*B41J 2/045*　　　(2006.01)
　　*B41J 2/155*　　　(2006.01)
　　*B41J 29/393*　　(2006.01)

(52) U.S. Cl.
　　CPC ............... *B41J 2/155* (2013.01); *B41J 11/42* (2013.01); *B41J 29/393* (2013.01); *H04N 1/00015* (2013.01); *H04N 1/00037* (2013.01); *H04N 1/00039* (2013.01); *H04N 1/00045* (2013.01); *B41J 2029/3935* (2013.01)

(58) Field of Classification Search
　　CPC ............. B41J 2/04585; H04N 1/00045; H04N 1/00039; H04N 1/00037; H04N 1/00015; H04N 1/00087
　　USPC ........................................................ 358/1.12
　　See application file for complete search history.

(56) References Cited

U.S. PATENT DOCUMENTS

| | | | |
|---|---|---|---|
| 7,391,525 | B2 | 6/2008 | Chapman et al. |
| 7,798,587 | B2 | 9/2010 | Mizes et al. |
| 9,844,961 | B1 * | 12/2017 | Mantell .................. B41J 29/393 |
| 2006/0274377 | A1 | 12/2006 | Chun |
| 2011/0122455 | A1 * | 5/2011 | Elliot ................. H04N 1/00002 358/406 |
| 2011/0279513 | A1 | 11/2011 | Mizes et al. |
| 2011/0311290 | A1 | 12/2011 | Castells et al. |
| 2014/0240389 | A1 | 8/2014 | Wu et al. |

FOREIGN PATENT DOCUMENTS

| | | |
|---|---|---|
| EP | 1764996 | 3/2007 |
| GB | 2349213 | 10/2000 |

* cited by examiner

CALIBRATING A MEDIA ADVANCE SYSTEM OF A PAGE WIDE ARRAY PRINTING DEVICE

BACKGROUND

The description is related to printing devices, like page-wide array printing devices, having a media advance system. It further refers to calibrating a media advance system of a page-wide array printing device.

BRIEF DESCRIPTION OF THE DRAWINGS

Examples will be described, by way of example only, with reference to the accompanying drawings in which corresponding reference numerals indicate corresponding parts and in which.

DETAILED DESCRIPTION

In general, a page-wide array printing device comprises a print medium transport path and a print element, such as a print head or a print bar comprising an array of print heads, extending the full width of the print medium transport path. Such an arrangement allows the entire width of a print medium to be printed simultaneously. A printing device refers generally to devices which can produce printed output, including but not limited to, for example, a printer, a photocopier, a fax machine, etc.

A print medium may be any kind of sheet-like medium, such as paper, cardboard, plastic or textile. The print element may be fixed within the printing device, and a print medium may be advanced past the print element along the print medium transport path by a media advance system. During a printing process, the print medium is advanced in the direction of a media axis ("medium-advance direction") through a print zone where an image or images are printed on the print medium by the print element. In some examples, the image may be printed on the print medium in rows or swaths. In other examples, the image may be printed continuously while the print medium is advancing below the print element. Images refers to any kind of depiction of signs, symbols, numbers, letters, text and/or graphics which may be applied to the print medium. In some examples, the height of the printed swaths (as measured in the medium-advance direction) may be fixed for a particular print element.

Media advance systems may include, e.g. motors, gears, rollers, sensors, and other components which work in conjunction to advance the print medium incrementally or continuously. Due to, e.g. geometric deviation in the hardware used to advance the print medium or the hardware used to read the advancement of the print medium, mismatches between the expected or read position of the print medium and its actual position can occur. For example, one component in a media advance system is a media drive roller. A deviation of the drive roller diameter from its ideal diameter or a deviation of its circumferential shape from the ideal circular shape can lead to runout (feedrate) errors, causing the print medium to be, e.g. underfed and to substantially sinusoidal "once-per-revolution" errors of the printing device. These errors cause different print quality issues with different severities. For example, a misalignment between the sections printed in one row or swath, or continuously in at least one printing line, by the print element may appear on the print medium. Here, the term printing line may refer to the line which results from the printing resolution of the printing device in direction of the media axis. To compensate for these errors and, thus, to ensure print quality, the media advance system has to be calibrated accordingly.

Figure 1:
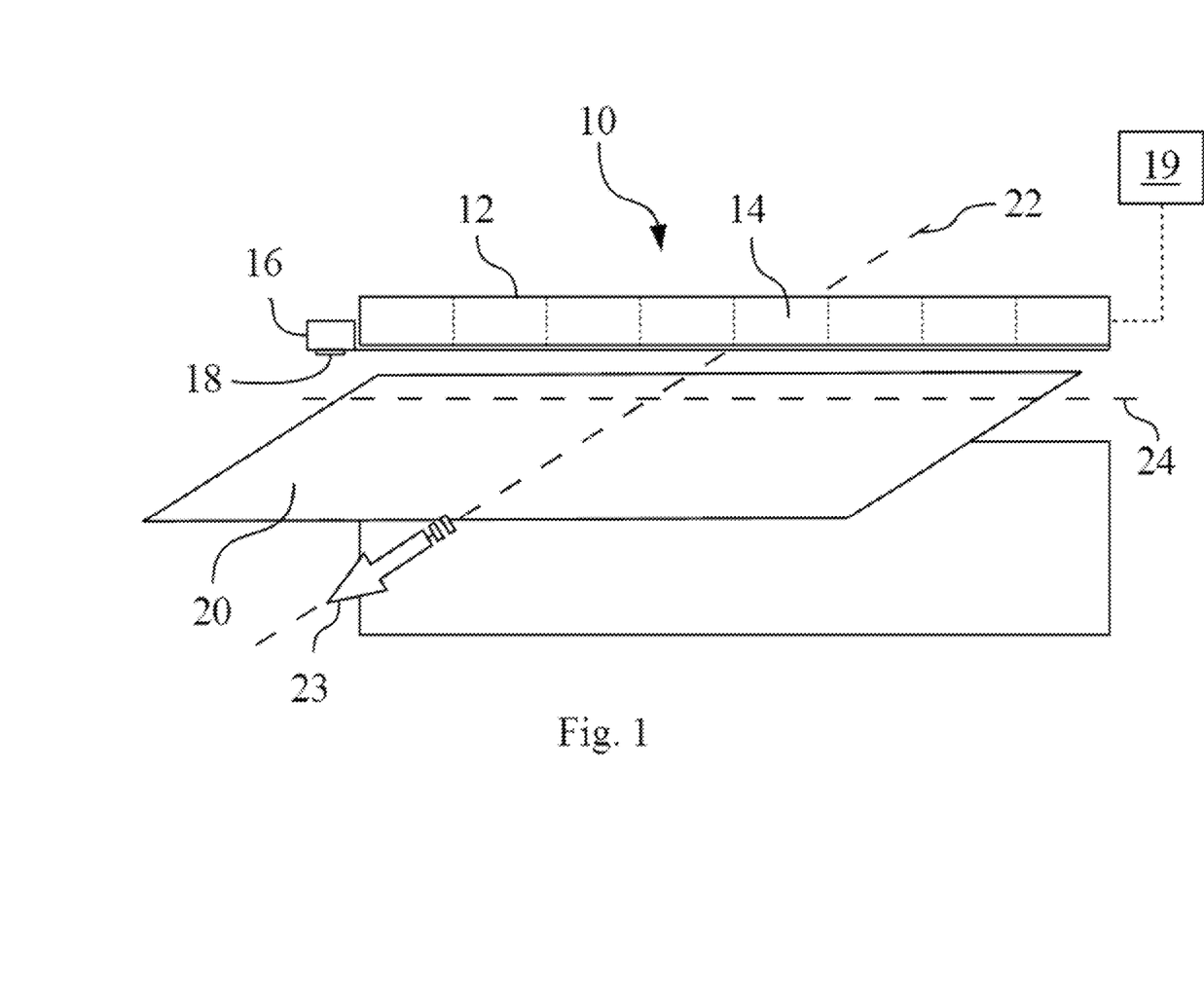
FIG. 1 is a schematic view of an example printing device.

FIG. 1 shows an example of a page-wide array printing device, namely a page-wide array printer 10, which comprises a media advance system (not shown) and a print element such as a print bar 12. The print bar 12 comprises an array of print heads 14, for example eight print heads 14. The number of print heads 14 may be fewer, such as in the order of one, two, three or four print heads, or greater, such as in the order of ten, fifty, one hundred or even more. In some examples, the print bar 12 comprises a single print head 14 that may have the same length as the print bar 12.

The printer 10 further comprises a carriage 16 which is attached moveable to, e.g. the print bar 12, such that it can be moved along the direction of the print bar 12. Such a carriage 16 may comprise, among others, service elements, for example for performing print head servicing. The carriage 16 further comprises a sensor 18, e.g. an optical sensor, to scan the print medium 20.

The media advance system advances the print medium 20 along a media axis 22 in the direction of arrow 23 ("medium-advance direction") past the print bar 12 which may print images on the print medium 20. The carriage 16 is moveable transversely to the media axis 22 along the direction of the print bar 12. The scanner is arranged such that it scans the print medium 20 while the carriage 16 moves across the print medium 20 along a scan axis 24 which is orthogonal to the media axis 22.

The printer 10 further comprises a controller 19 which is connected to the media advance system and to the sensor 18. The controller 19 receives output signals from the sensor 18. The controller further controls the advancement of the print medium 20 by the media advance system. For example, the controller controls the advancement of the print medium 20 based on the received output signals from sensor 18.

In some examples, the printer 10 is an ink-jet printer and the each print head 14 comprises a plurality of nozzles. In some examples, the nozzles are arranged in arrays on the print head 14. In some examples, the arrays of nozzles are arranged on dies on the print head 14.

Figure 2:
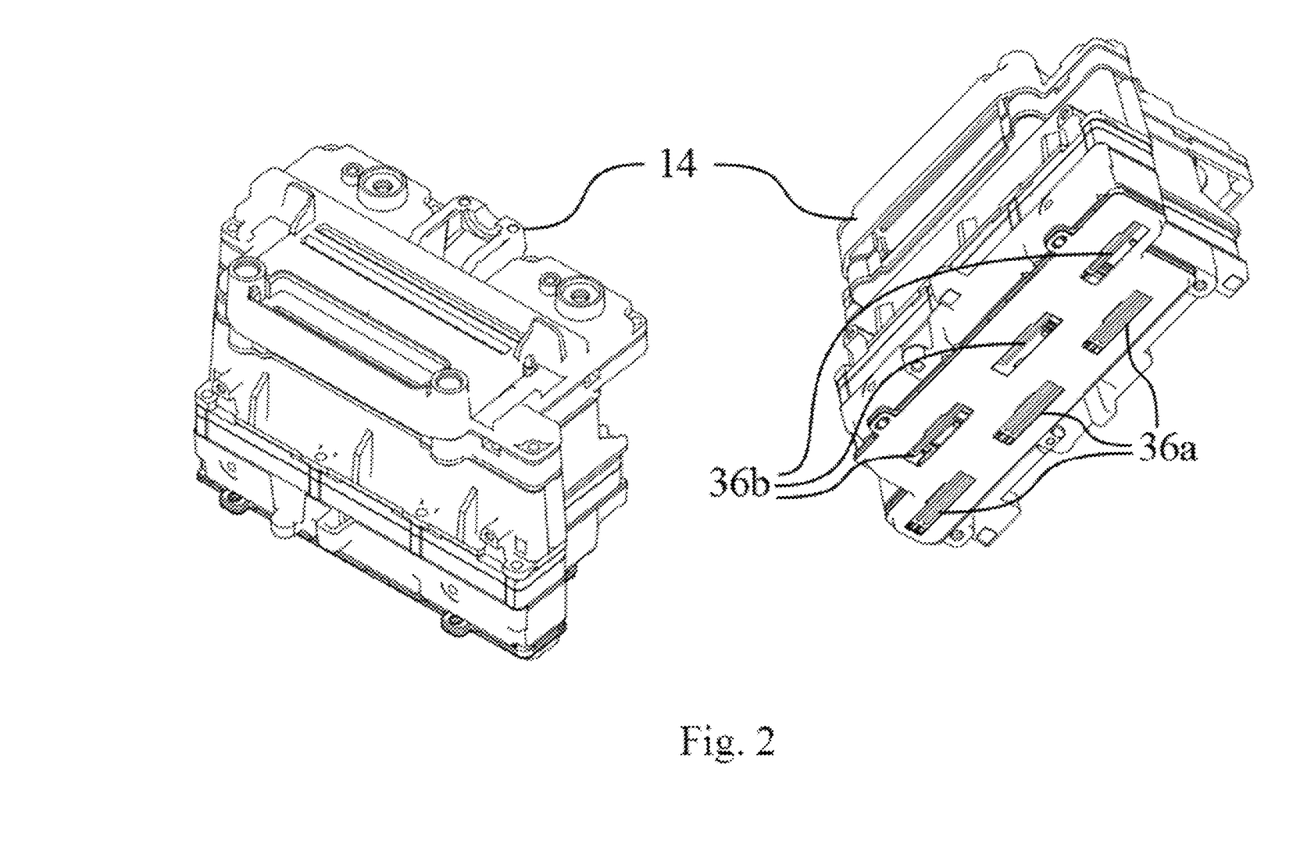
FIG. 2 shows two different views of an example print head.

FIG. 2 shows an example print head 14 in two different views, a top view (left) and a bottom view (right). The print head 14 comprises a plurality of thermal inkjet chips, referred to as dies 36a, 36b. For example, the print head 14 comprises six dies 36a, 36b. In some examples, the number of dies 36a, 36b may be fewer, such as two or four dies 36a, 36b, or greater than six, such as eight or ten dies 36a, 36b. The dies 36a, 36b may be precision-aligned and placed on a dimensionally stable substrate. The substrate provides, e.g. mechanical alignment, printing fluid supply channels and electrical interconnection (not shown).

The dies 36a, 36b are arranged in two rows, a row of even dies 36a and a row of odd dies 36b at the bottom of the print head 14. Each die 36a, 36b comprises at least one array of nozzles (not shown). In some examples, each die 36a, 36b comprises one array of nozzles for each color. For example, each die 36a, 36b may comprise four arrays of nozzles for each of four colors to be printed. The number of nozzles per array is directly related to the printing resolution measured in dots per inch ("dpi"). In some examples, there are more than 1,000 nozzles for each array, resulting in more than 4,000 nozzles for each die 36a, 36b in the case of a multi-color printer and a printing resolution of, e.g. as much as 1,200 dpi.

The print head 14 has no moving parts. The print head 14 ejects drops of printing fluid through the nozzles. The ejection of printing fluid may be triggered by the controller 19. In some examples, each drop has to emerge at a consistent weight, speed and direction to place a dot of correct size in the correct location. Also the distance between the print heads 14 and the print medium 20 may be controlled accurately.

Figure 3:
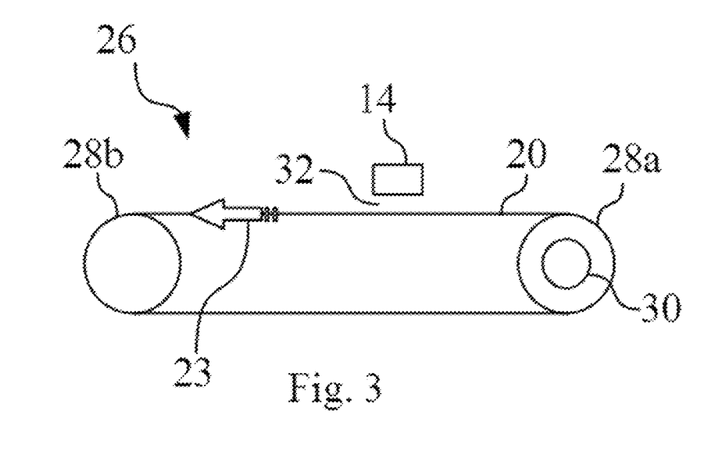
FIG. 3 is a schematic view of an example media advance system.

FIG. 3 show an example of a media advance system 26 comprising two rollers, i.e. an idler roller 28a at an input side and a drive roller 28b at an output side. The print medium 20 is advanced along the medium-advance direction 23 from the input side through a print zone 32, where an example print head 14 can print images onto the print medium 20, to the output side. The print head 14 and, accordingly, the corresponding print bar (not shown), is fixed within the printer 10 such that the print head 14 is in a position above the print zone 32 and, thus, above the print medium 20 if present.

The media advance system 26 may further comprise or be connected with at least one encoder 30. Encoders are commonly used in printers for accurately advancing the print medium 20. The print medium may be advanced continuously or between swaths or scans. The encoder 30 may be connected, for example, to the idler roller 28a at the input side. In other examples, the encoder 30 may be connected to the drive roller 28b at the output side. In further examples, each roller 28a, 28b may be connected to a respective encoder (not shown). The encoder 30 may be a digital encoder or an analog encoder 30. In some examples, one encoder, for example a digital encoder, is connected to the drive roller 28b, and another encoder, for example an analog encoder, is connected to the idler roller 28a. In some examples, the encoder 30 is an optical encoder 30. In some examples, the encoder 30 is a rotary encoder 30. In some examples, the encoder 30 is a rotary optical encoder 30.

The encoder 30 generates output signals which provide the controller with an indication of the position of the print medium 20 as the print medium 20 is advanced through the printer 10. The controller, in turn, controls the media advance system 26 as needed to advance the print medium 20.

For example, when the print medium 20 is advanced through the print zone 32 by the media advance system 26, an image can be printed to the print medium 20 by the print heads 14 of the print bar 12 in rows or swaths or continuously while the print medium 20 is advancing below the print heads 14. To ensure that the swath to be printed or the printing line to be printed is accurately aligned with the previous swath or printing line, respectively, a read position of the print medium 20 is indicated by output signals of an encoder 30 which are read by the controller. The controller controls the drive mechanism of the media advance system 26 such that the print medium 20 is advanced incrementally or continuously by the proper amount needed based on the read position of the print medium 20.

Since the encoder 30 is connected to one of the rollers 28a, 28b, the encoder output signals only indirectly indicate the actual position of the print medium 20. Moreover, the encoder 30 as well as the rollers 28a, 28b can be susceptible to runout errors. It is known that in some examples runout errors are sinusoidal varying errors that occur as a result of slight variations in the concentricity of, e.g. the rollers 28a, 28b. For example, a runout error may arise when the outer surface of a roller, e.g. a drive roller is not precisely concentric with the axis about which that roller rotates.

As a result of runout errors, the magnitude of the position changes of the print medium as indicated by the encoder output signals will not precisely match the actual position change of the print medium. Thus, a mismatch between the read position of the print medium and its actual position occurs.

In some examples, at least one of the rollers 28a, 28b is driven by a power unit (not shown), such as a motor (e.g. a DC servo motor), to advance the print medium 20 through the printer 10. For example, the drive roller 28b at the output side may be driven by a servo motor while the roller 28a at the input side is an idler roller.

In some examples, the media advance system further comprises a mechanism to hold down the print medium 20 in the print zone 32. In some examples, the media advance system 26 further comprises a mechanism to control the spacing between the print bar 12 and the print medium 20.

However, mismatches between the read position and the actual position of the print medium can lead to print quality issues, such as defects or irregularities in the printed image. For example, dot placement errors or lack of fidelity in reproduction of colors may occur. Thus, the media advance system may be calibrated using calibration values such that the mismatch between the read position and the actual position of the print medium may be compensated, print quality may be ensured and/or the print quality issues mentioned above may be solved.

To determine the calibration values for the media advance system, first a test pattern is printed on a calibration medium. In some examples, the test pattern is printed on the calibration medium with the printer to be calibrated (i.e. the printer having the media advance system to be calibrated) while the calibration medium is advancing along the media axis through the printer. The test pattern comprises a plurality of test marks.

Then the test pattern is scanned along the scan axis which is orthogonal to the media axis. In some examples, the test pattern is scanned using the sensor in the carriage which is moveable along the scan axis. The test pattern may be scanned while the calibration medium advances through the printer along the media axis. In some examples, the test pattern is printed on the calibration medium with the printer while the calibration medium advances along the media axis in the media-advance direction. After the test pattern has been printed, the calibration medium is advanced backwards along the media axis opposite to the media-advance direction. Then, the test pattern is scanned by the sensor in the carriage while the calibration medium is advanced a second time through the printer in the media-advance direction, wherein the carriage including the sensor is moved along the scan axis transversely across the calibration medium.

The scanned signals are analyzed to determine the dimensions of the scanned test marks. For example, as a result of the analysis of the signals, the width, the length and/or the height of the test marks may be determined.

The analyzed dimensions of the test marks are then used to determine the calibration values for the media advance system.

Figure 4:
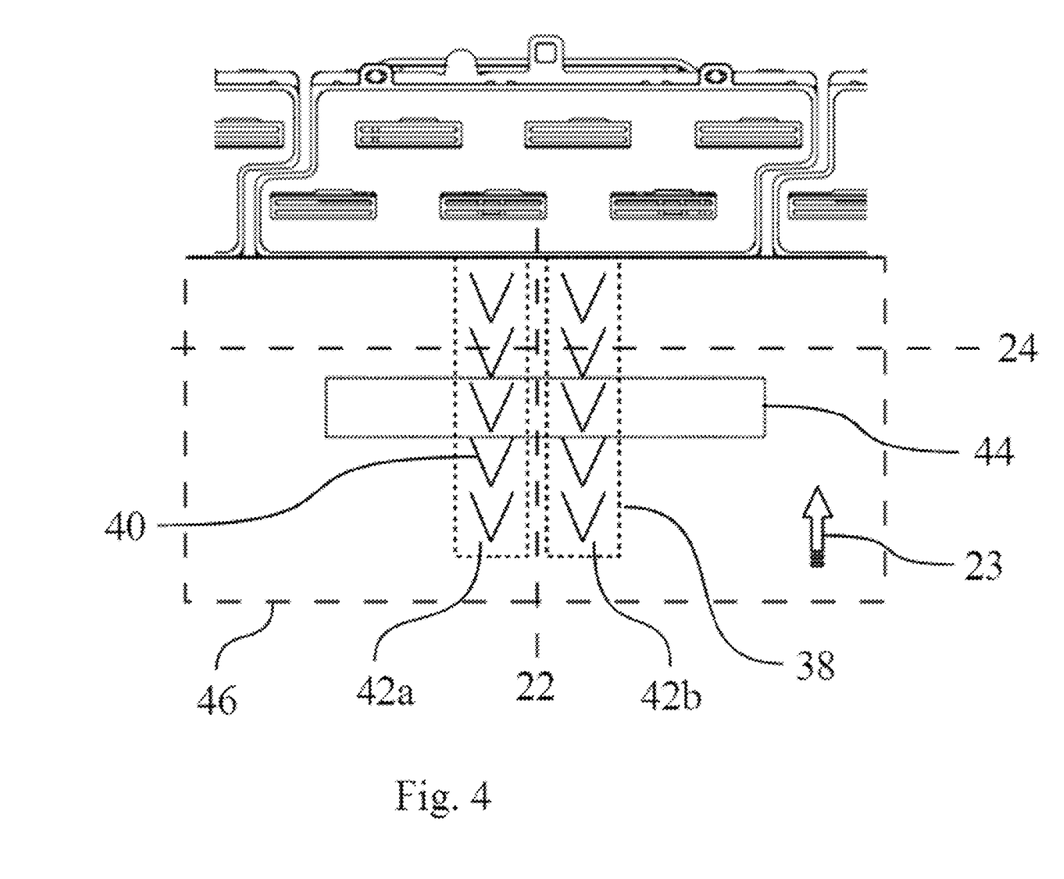
FIG. 4 is a schematic view of an example test pattern which is printed onto the print medium by an example print head.

FIG. 4 illustrates an example test pattern 38 which is printed on a calibration medium 46 by an example print head 14. The print head 14 is one of a plurality of print heads 14 of a print bar 12, of which only a section is shown. The print head 14 comprises two rows of dies, a row of even dies 36a and a row of odd dies 36b. For example, the print head 14 comprises six dies 36a, 36b, three of which for each row of dies.

The test pattern 38 comprises a plurality of test marks 40. For example, the test pattern 38 comprises two columns of test marks 40 which are aligned with the media axis 22. The test pattern 38 is printed to the calibration medium by the print head 14, in particular by the dies 36a, 36b of the print head 14. For example, one column 42a of test marks 40 is printed to the calibration medium 46 by an even die 36a and another column 42b of test marks 40 is printed to the calibration medium 46 by an odd die 36b.

The columns of test marks 40 are printed to the calibration medium such that a plurality of rows 44 of test marks 40 which are spaced apart from each other along the media axis 22 is formed on the calibration medium 46. Each row 44 of test marks 40 comprises at least two test marks 40 and is aligned with the scan axis 24.

Figure 5:
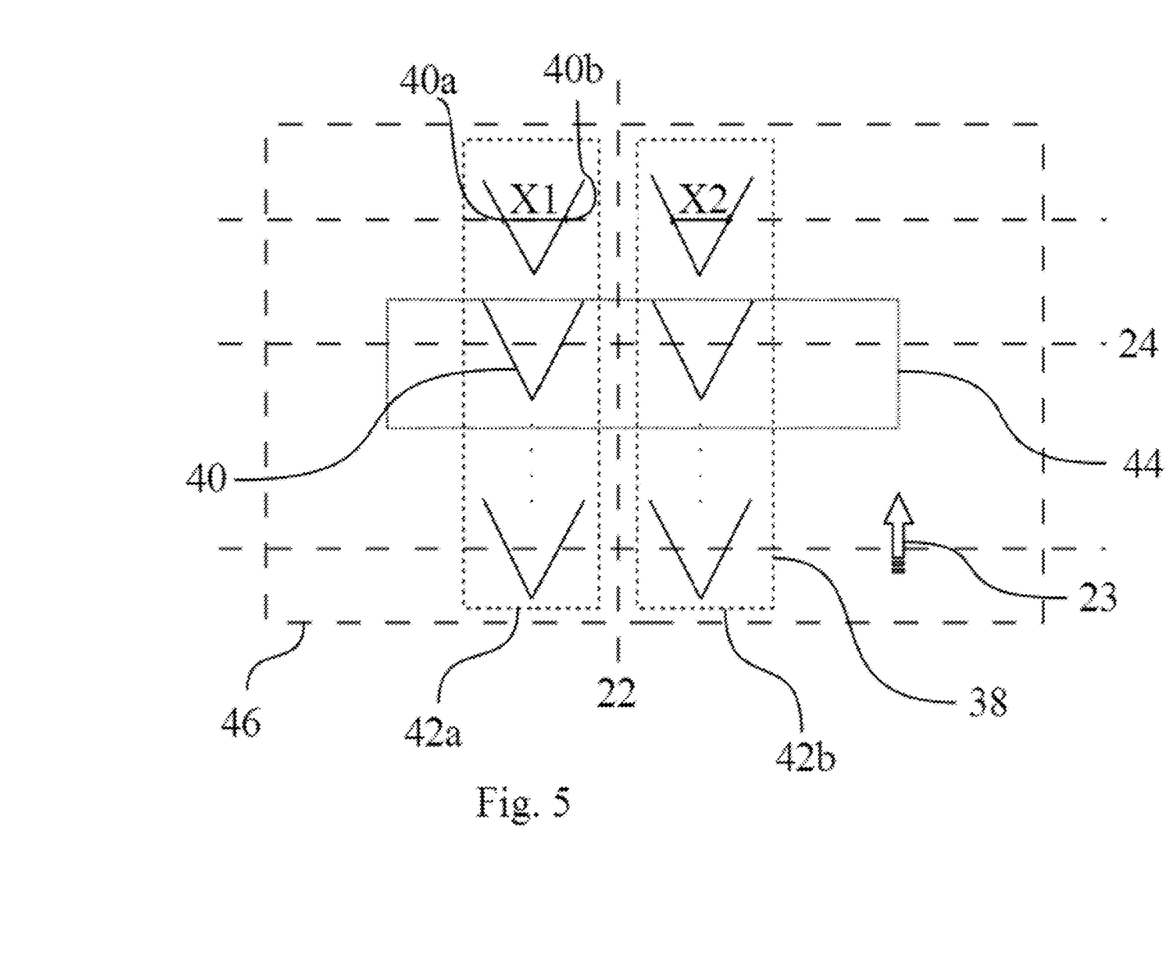
FIG. 5 is a more detailed view of the example test pattern.

As the calibration medium 46 advances along the media axis 22 in the media-advance direction 23, it will reach a position below the row of even dies 36a before it reaches a position below the row of odd dies 36b. Thus, an offset between the triggers to eject printing fluid from the row of even dies 36a and from the row of odd dies 36b, respectively, may be taken into account to align the test marks 40 in rows FIG. 5 is a more detailed illustration of the test pattern 38 comprising test marks 40. Each test mark 40 has two portions 40a and 40b which are tapered (see also discussion below) with respect to each other along the media axis 22. The test marks 40 are printed to the calibration medium 46 in two columns 42a, 42b, which are aligned with the media axis 22 and located spaced-apart and adjacent to each other on the calibration medium 46. Thus, rows 44 of test marks 40 are formed which are spaced apart from each other along the media axis 22 and aligned with the scan axis 24, wherein each row 44 comprises one test mark 40 of each of the two columns 42a, 42b, respectively.

In some examples, two columns 42a, 42b, each having N test marks 40 are printed to the calibration medium 46. Thus, N rows 44 having two test marks 40 each, one for each of the two columns 42a, 42b, are formed, wherein the test marks 40 of each of the N rows 44 are aligned with the scan axis 24 and wherein the N rows 44 are spaced apart along the media axis 22. In some examples, the number of columns may be larger than two, such as three, four, six or eight or even more. In some examples, the number N of rows 44 is in the order of two or three rows. In other examples the number N of rows 44 is in the order of ten, twenty or forty rows. The number N of rows 44 may also be larger than forty.

In some examples the test marks 40 have a triangular shape, for example the shape of a "V" or a reversed "V or a caret. In other examples the test marks 40 have a parabolic shape, for example the shape of a "U" or a reversed "U". The test marks 40 may also have a semi-circular shape, such as a "⌣" or reversed. In some examples, the test mark 40 comprises two portions 40a, 40b which are not linked to each other but positioned to each other to form a tapered test mark 40, such as a "/\".

In the following, the method for determining calibration values for the media advance system using the calibration medium 46 onto which the test pattern 38 is printed will be described in more detail.

As an initial step, the test pattern 38 is printed on a calibration medium 46 while the calibration medium 46 is advanced through the printer 10 along the media axis in the media-advance direction by the media advance system. The calibration medium 46 onto which the test pattern 38 is printed is then fed into the print medium transport path of the printer 10 again, such that it can be advanced through the printer 10 along the media axis in the media-advance direction by the media advance system again. The position of the calibration medium 46 may be read by the encoder which is connected to the drive roller of the media advance system and signaled to the controller 19 of the printer 10.

The calibration medium 46 including the test pattern 38 is then advanced through the print zone, above which the print bar 12 and the carriage 16 including the sensor 18 are arranged. While the calibration medium 46 advances through the print zone 32, the carriage 16 including the sensor 18 is moved across the calibration medium 46 along the scan axis row-by-row. Thus, each row 44 of test marks 40 is scanned by the scanner along the scan axis.

In some examples, the calibration medium 46 is advanced backwards along the media axis 22, i.e. opposite to the media-advance direction 23, by the media advance system after the test pattern 38 has been printed thereupon. It then starts advancing forward again to allow the sensor 18 to scan each row 44 of test marks 40.

The sensor 18 particularly scans the dimensions of the test marks 40. For example, each time the sensor 18 detects an edge of a test mark 40, it outputs a corresponding output signal to the controller 19, indicating the position of the edge of the test mark 40 along the scan axis. Thus, based on the sensor signals the controller can analyze the dimensions of the test marks 40. The controller further receives corresponding signals from the encoder 30 which indicate the corresponding position of the calibration medium 46 along the media axis and, thus, the position of the currently detected test mark 40 on the calibration medium 46 with respect to the media axis 22.

For example, in the case of a test pattern 38 as shown in FIG. 5, i.e. comprising N rows 44 of two test marks 40 along the scan axis, respectively, the test marks 40 having the shape of an inverted "V", the sensor 18 detects a first edge of the test mark 40 when it reaches the first portion 40a of the test mark 40 and a second edge of the test mark 40 when it reaches the second portion 40b of the test mark 40 as it moves along the scan axis 24. The sensor 18 outputs corresponding detection signals which indicate the positions of the two edges along the scan axis to the controller 19. By analyzing these signals the controller 19 can determine the width X1 of the test mark 40 as the distance between the positions of the two edges of the two portions 40a, 40b along the scan axis 24. Correspondingly, the controller also determines the width X2 of the second test mark 40 in the currently scanned row of test marks 40.

The first test mark 40 along the scan axis 24 belongs to the first column 42a of test marks, whereas the second test mark 40 along the scan axis 24 belongs to the second column 42b of test marks 40. As already explained, the first column 42a of test marks 40 is printed on the calibration medium 46 by an even die 36a and the second column 42b of test marks 40 is printed on the calibration medium 46 by an odd die 36*b* of the print head 14. There is a constant offset between the row of even dies 36*a* and the row of odd dies 36*b*. Thus, to ensure that the test marks 40 of each row 44 are aligned along the scan axis 24, there is a constant delay between triggering the ejection of printing fluid by the even die 36*a* and the odd die 36*b*.

If there are no mismatches between the read position of the print medium 20 and its actual position, the alignment of the test marks 40 of each row 44 of test marks 40 will be perfect and the difference X1-X2 of the widths X1 and X2 of the two test marks 40 will be constant along the rows 44, assuming the two test marks 40 to be identical. However, if there is a mismatch between the read position and the actual position of the print medium 20, the test marks 40 will be misaligned and the widths X1 and X2 will differ. Therefore, calculating the differences X1-X2 of the widths X1, X2 for each pair of test marks 40 allows calibration values which indicate the magnitude of the die to die advance error to be determined.

Print quality issues related to media advance performance limitations may appear mainly due to the mismatch between the read and the actual position of the print medium. One of its main contributors may be the runout of the roller with which the encoder 30 is connected. Another contributor may be the eccentricity of the encoder 30 with respect to the roller revolution axis.

The runout of, e.g. the drive roller and the eccentricity of the encoder 30 cause a periodically variable, in particular sinusoidal, mismatch between the read and the actual position of the print medium. The period of its frequency corresponds to one revolution of the roller with which the encoder 30 is connected. Without any calibration or compensation, both rows of dies 36*a*, 36*b* may see the print medium 20 speed in different phases due to the distance between the rows 36*a*, 36*b*. In some examples, one revolution of, e.g. a drive roller may be about 212 mm and the distance between the row of even dies 36*a* and the row of odd dies 36*b* may be about 18 mm. That is, the rows of dies 36*a*, 36*b* are in approximately 30 degrees of the frequency with respect to the drive roller revolution. In other words, the odd row of dies 36*b* may see the print medium 20 with a delay of 30 degrees compared to the even row of dies 36*a*.

The trigger for ejecting printing fluid onto the print medium 20 considers an offset or distance between both rows of dies 36*a*, 36*b*, but it only contemplates a constant delay, not a variable delay. However, the sinusoidal signal of the encoder 30 is causing a variable delay which changes along a plot with a frequency of one revolution of the roller with which the encoder 30 is connected. Consequently, the trigger for ejecting printing fluid onto the print medium 20 is generated with an error which is variable along the media axis.

Figure 6:
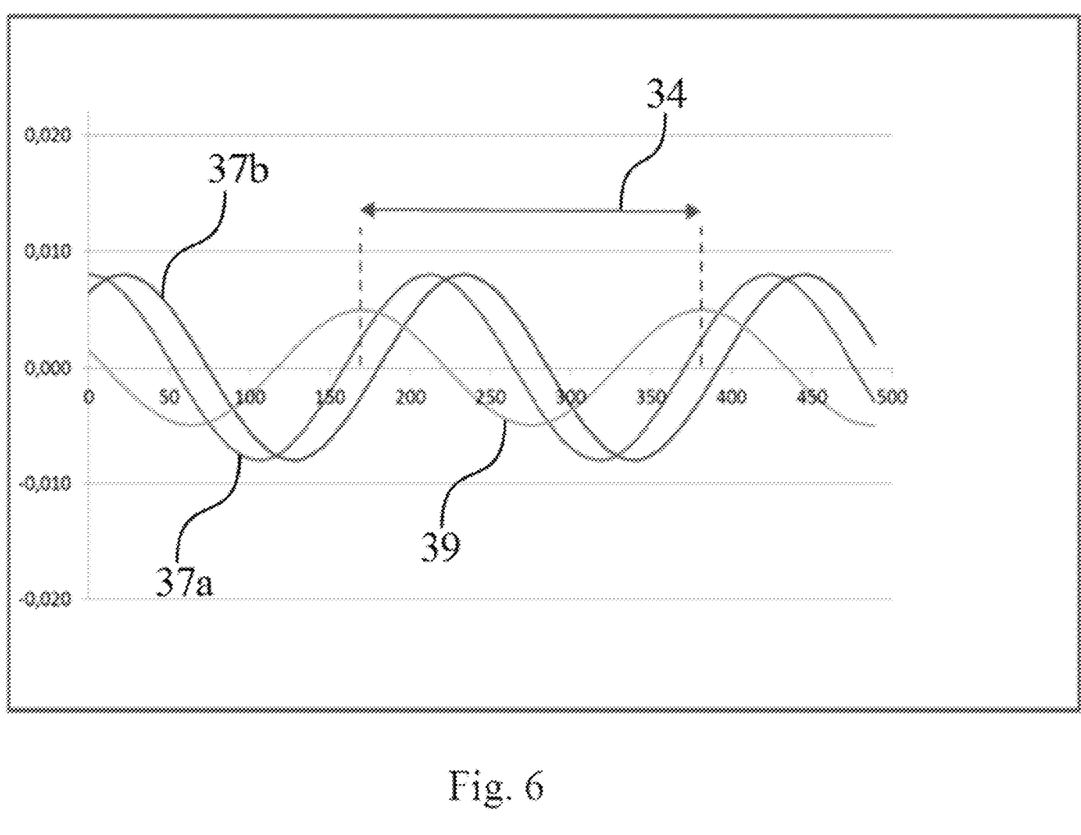
FIG. 6 shows an example sinusoidal error of the printer.

FIG. 6 shows the position error variation of the print medium in mm and the delay of 30 degrees between the rows of even and odd dies 37*a*, 37*b*. It further shows the variable error 39 resulting from this variable delay, as explained above. The period of its frequency which corresponds to one revolution of the roller 28*a* is indicated by arrow 34. The variable error causes print quality issues that can be noticed by the user.

For example, the test pattern 38 as shown in FIG. 6 comprises different sections, i.e. columns of test marks 40, each of which is printed by a different row of dies, even and odd 36*a*, 36*b*. The print quality issue then appears as a variable misalignment between the two columns 42*a*, 42*b* of test marks 40. The variable misalignment can be compensated with a corresponding calibration using the determined calibration values. For example, the calibration values can be used to compensate a sinusoidal error.

As mentioned above, the calibration values are determined by calculating the differences X1-X2 of the widths X1, X2 of the test marks 40 for each row 44 of test marks 40. Due to the variable mismatch between the read and the actual position of the calibration medium 46, these differences X1-X2 are generally non-zero and variable, in particular sinusoidal.

Figure 7:
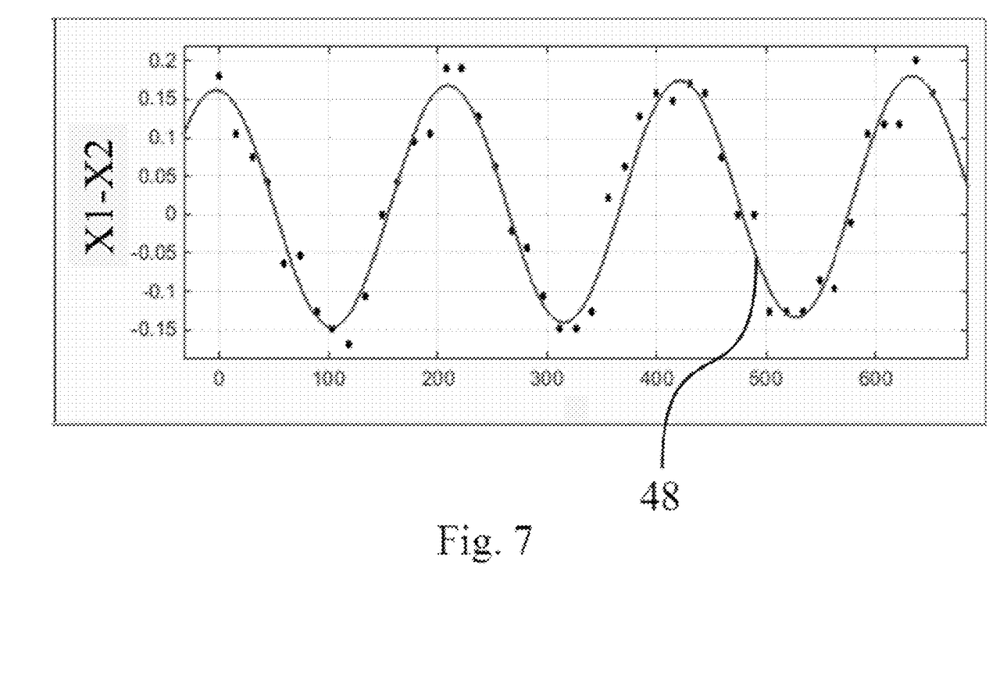
FIG. 7 shows an example fit of a sinusoidal function to the errors.

FIG. 7 shows a plot of these differences X1-X2 with respect to the advancing position of the calibration medium 46 in mm as read by the encoder 30. As explained above, the sensor 18 scans each row 44 of test marks 40 and, thus, the difference X1-X2 is calculated for each row 44. The rows 44 of test marks 40 have been printed on the calibration medium 46 which, in turn, has been advanced through the print zone 32 row-by-row, i.e. each time a row 44 of test marks 40 has been printed on the calibration medium 46, the calibration medium 46 has been advanced by an amount corresponding to the distance between two adjacent rows 44. The controller 19 which is connected to both the encoder 30 and the sensor 18 thus knows the number N of the row 44 for which the test pattern 38 is currently printed (during the test pattern printing step) and for which the test pattern 38 is scanned (during the scanning step). The controller further knows the position of this current row 44, i.e. the N-th row, on the calibration medium 46 as read by the encoder 30.

A sinusoidal function 48 is fitted to these data points and its amplitude A and phase θ are calculated. The fitting can be done with different methods depending on the selected curve fit algorithm. The function 48 may also be determined by any known way of interpolation, extrapolation, regression analysis or the like. Each data point represents the misalignment in one particular row 44 of test marks 40. To calculate the phase θ properly, it may be important to know the position of the plot related to a zero/index of the encoder 30. The zero/index may be the reference to apply the calibration parameters during the normal printing operation. Based on these calibration values, i.e. the amplitude A and phase θ of the sinusoidal fit function, the media advance system 26 may be calibrated. To facilitate the fitting of a sinusoidal function to the data points and the evaluation of the fit function, all test marks 40 of all N rows 44 may be identical.

Thus, the calibration values may be used to determine for each printing line to be printed during a normal printing process a compensation value for which the misalignment as calculated on the basis of the calibration values and the sinusoidal fit function may be compensated. Here, the term printing line may refer to the line which results from the printing resolution of the printer 10 in direction of the media axis 22. During the calibration process, the misalignment is determined for each row 44 of test marks 40. Each test mark 40 may encompass a number of test mark printing lines. Thus, the number of rows 44 may be lower than the number of printing lines by the factor of the number of test mark printing lines. In some examples, the number of test mark printing lines is twice as much as the value (in terms of printing lines) of the maximum expected misalignment. In some examples, the difference X1-X2 is scanned and calculated for more than one test mark printing line, e.g. for each printing line, and then an averaged misalignment value is determined for each row 44 on the basis of the misalignment values calculated for each scanned test mark printing line of test mark 40 of that row 44. In some examples, a sinusoidal function is fitted to the differences X1-X2 as scanned and calculated for each printing line.

It is again referred to the term tapered test mark which will now be further explained on the basis of the above term test mark printing lines. As a test mark may encompass a number of test mark printing lines, a tapered test mark may result if, for instance, the width of the test mark monotonously increases or decreases as a function of the test mark printing line. In other words, if the test mark has a given width in its topmost test mark printing line then its width monotonously increases or decreases for every subjacent test mark printing line.

The calibration values A and θ may be stored in a memory such that they can be applied to the media advance system 26 repeatedly during each printing process. The memory may be an internal memory of the printer 10 and/or the controller 19. The memory may also be an external memory to which the printer 10 and/or the controller 19 is connected.

Figure 8:
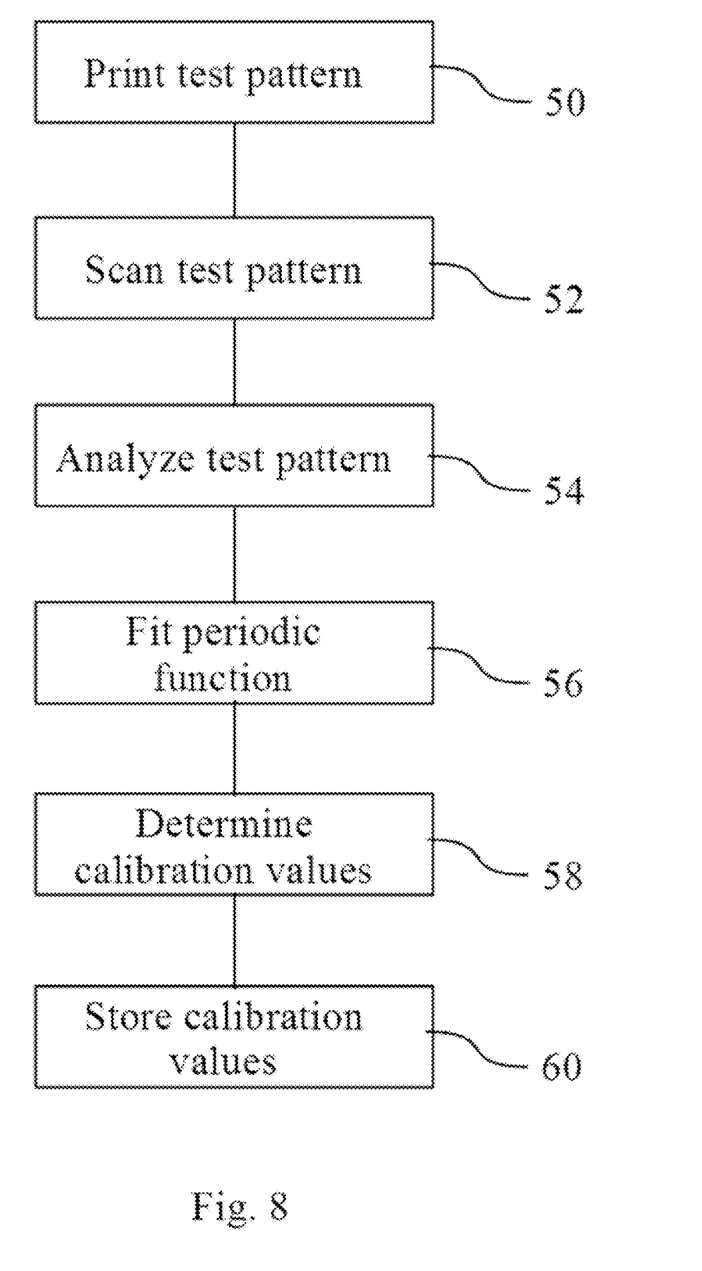
FIG. 8 is a block diagram illustrating the method for determining calibration values.

Now referring to FIG. 8 which illustrates an example method for determining calibration values of a media advance system of a page-wide array printing device.

The example method includes, in block 50, printing the test pattern 38 comprising a plurality of test marks 40 onto the calibration medium 46. The calibration medium 46 advances along a media axis through the printer 10. The calibration medium 46 may be any kind of sheet-like medium, such as paper, cardboard, plastic or textile. In particular, the calibration medium 46 may be of the same kind as the print medium 20.

The example method further includes, in block 52, scanning the test pattern along a scan axis 24 which is orthogonal to the media axis 22. The test pattern 38 is scanned using a sensor 18. In particular, the sensor 18 scans the test marks 40 along the scan axis 24. For example, the sensor 18 may detect the edges of the test marks 40 along the scan axis 24. The calibration medium 46 is advanced along the media axis through the printer 10.

In block 54, the scanned test pattern 38 is analyzed. In particular, the dimensions of the scanned test marks 40 are analyzed. For example, the sensor 18 may output signals to the controller 19 which indicate the detection of edges of the test marks 40. In particular, the sensor 18 may detect the edge of a first and a second portion 40*a*, 40*b* of each test mark 40. The controller 19 may determine, based on these signals, the widths X1, X2 of the test marks 40 as distances between the two portions 40*a*, 40*b* of each test mark 40 along the scan axis 24.

Analyzing the test pattern may further include determining the differences of the widths X1, X2 of the test marks 40 of one row 44 of test marks 40.

The example method may further include, in block 56, fitting a periodic function to the determined differences of the widths X1, X2 of the test marks 40 with respect to the corresponding row 44 of test marks 40. In particular, the periodic function may be a sinusoidal function.

In block 58, the calibration values are determined based on the analyzed dimensions of the test marks 40. In particular, the calibration values may be determined based on the analyzed widths X1, X2 of the test marks 40. More particularly, the calibration values may be determined based on the determined differences of the widths X1, X2 of the test marks 40. For example, the calibration values may be determined based on the periodic, e.g. sinusoidal function which may be fitted to the determined differences of the widths X1, X2 of the test marks 40 with respect to the corresponding row 44 of test marks 40 in block 56. For example, the calibration values may be based on the fit parameters, such as the amplitude A and the phase θ of the fit function.

The example method may further include, in block 60, storing the calibration values to a memory. The memory may be an internal memory of the printer 10. The memory may also be an external memory which is connected to the printer 10 and/or the controller 19.

The example method may be performed by a processor, for example a computer processor, which has been instructed accordingly. The instructions for the processor may be stored on a medium, particularly on a computer readable medium. The computer readable medium may be a non-transitory computer readable medium. The instructions may be stored on the medium in the form of a program.

While several examples have been described in detail, it is to be understood that the disclosed examples may be modified. Therefore, the foregoing description is to be considered non-limiting.

What is claimed is:

1. A method of determining calibration values for a media advance system of a page wide array printing device, comprising:
   printing a test pattern comprising a plurality of test marks on a calibration medium, which advances along a media axis through the page wide array printing device;
   scanning the test pattern along a scan axis using a sensor and advancing the calibration medium along the media axis through the page wide array printing device;
   analyzing dimensions of the test marks of the test pattern that is scanned; and
   determining calibration values from the dimensions of the test marks that are analyzed to adjust a printhead for runout errors caused by a media advance system variation in the media advance system of the page wide array printing device, wherein the scan axis is orthogonal to the media axis.

2. The method according to claim 1, wherein the printhead comprises at least two different rows of dies, and wherein printing the test pattern on the calibration medium comprises printing at least two columns of test marks on the calibration medium, the at least two columns being aligned with the media axis, wherein at least one die of each of the at least two different rows of dies prints at least one column of test marks on the calibration medium.

3. The method according to claim 2, wherein the at least two columns of test marks are printed on the calibration medium such that a plurality of rows of test marks is formed on the calibration medium, the plurality of rows being spaced apart from each other along the media axis, and wherein each row comprises at least two test marks of different columns of test marks, and wherein each row is aligned with the scan axis.

4. The method according to claim 3, wherein analyzing the test marks of the test pattern that is scanned includes determining widths of at least two test marks of at least one of the plurality of rows along the scan axis to measure an amount of the runout errors.

5. The method according to claim 4, wherein the width of a test mark is a distance between the two portions of the test mark along the scan axis.

6. The method according to claim 5, wherein determining the calibration values includes determining differences of the width of the at least two test marks of the at least one row along the scan axis.

7. The method according to claim 6, wherein determining the calibration values further includes fitting a periodic function to the differences of the width of the at least two test marks that is determined with respect to the corresponding row of test marks.

8. The method according to claim 7, wherein the periodic function is a sinusoidal function.

9. The method according to claim 1, wherein the test marks each have two portions which are tapered with respect to each other along the media axis.

10. A page wide array printing device, comprising:
- a media advance system;
- a print element;
- a sensor; and
- a controller, wherein the page wide array printing device is to determine calibration values for a media advance system by printing a test pattern comprising a plurality of test marks on a calibration medium which advances along a media axis through the printing device, scanning the test pattern along a scan axis using the sensor and advancing the calibration medium along the media axis through the printing device, analyzing dimensions of the test marks of the test pattern that is scanned, and determining calibration values from the dimensions of the test marks that are analyzed to adjust the print element for runout errors caused by a media advance system variation in the media advance system of the page wide array printing device, wherein the scan axis is orthogonal to the media axis.

11. The printing device according to claim 10, wherein the media advance system comprises at least one encoder which is connected to the at least one roller.

12. The printing device according to claim 10, wherein the print element is one of a print head and a print bar.

13. The printing device according to claim 12, wherein the print element is a print bar comprising a plurality of print heads.

14. The printing device according to claim 13, wherein each print head comprises two rows of dies.

15. A non-transitory computer readable medium for storing a program causing a processor to perform a method of determining calibration values for a media advance system of a page wide array printing device, the method, comprising:
- printing a test pattern comprising a plurality of test marks on a calibration medium which advances along a media axis through the page wide array printing device;
- scanning the test pattern along a scan axis using a sensor and advancing the calibration medium along the media axis through the page wide array printing device;
- analyzing dimensions of the test marks of the test pattern that is scanned; and
- determining calibration values from the dimensions of the test marks that are analyzed to adjust a printhead for runout errors caused by a media advance system variation in the media advance system of the page wide array printing device wherein the scan axis is orthogonal to the media axis.

* * * * *

UNITED STATES PATENT AND TRADEMARK OFFICE
CERTIFICATE OF CORRECTION

PATENT NO. : 10,440,195 B2
APPLICATION NO. : 15/748562
DATED : October 8, 2019
INVENTOR(S) : Alberto Borrego Lebrato et al.

Page 1 of 1

It is certified that error appears in the above-identified patent and that said Letters Patent is hereby corrected as shown below:

In the Claims

In Column 10, Line 57, in Claim 5, after "between" delete "the".

Signed and Sealed this
Fourteenth Day of January, 2020

Andrei Iancu
*Director of the United States Patent and Trademark Office*